Patented Jan. 5, 1954

2,665,299

UNITED STATES PATENT OFFICE 2,665,299

STABILIZED COMPOSITIONS COMPRISING MONOMERIC 1,1-DICYANO ETHYLENE

Alan E. Ardis, Cuyahoga Falls, Ohio, assignor to The B. F. Goodrich Company, New York, N. Y., a corporation of New York No Drawing. Application May 7, 1952, Serial No. 286,600

5 Claims. (Cl. 260—465.8)

This invention relates to stabilized compositions comprising monomeric vinylidene cyanide and pertains more particularly to compositions comprising the crude product containing monomeric 1,1-dicyano ethylene which is obtained by pyrolyzing 1-acetoxy-1,1-dicyano ethane, and also comprising a dialkyl sulfate as a stabilizer for the momomeric 1,1-dicyano ethylene.

It is disclosed in U. S. Patent 2,476,270, that monomeric 1,1-dicyano ethylene can be obtained by pyrolytic decomposition at temperatures of about 400° C. to 750° C. of 1-acetoxy-1,1-dicyano ethane (also known as diacetyl cyanide) followed by separation of the monomeric 1,1-dicyano ethylene from the pyrolysis product. The monomeric 1,1-dicyano ethylene as thus obtained in relatively pure form is a remarkable monomer which can be polymerized, either alone or with other polymerizable monomers in a non-ionic medium to give homopolymers and interpolymers which can be utilized to form extremely valuable filaments, films, shaped articles and the like.

The pyrolysis of 1-acetoxy-1,1-dicyano ethane proceeds substantially as follows:

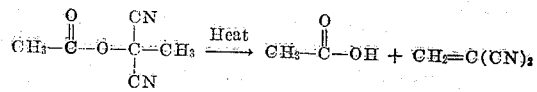

However, it has been observed in carrying out this reaction on a pilot plant or commercial scale, that the 1-acetoxy-1,1-dicyano ethane is not completely cracked pyrolytically to 1,1-dicyano ethylene and acetic acid; rather, there are several other unidentified products in the product resulting from the pyrolysis reaction.

It has been further observed that one or more or the unidentified products catalyzes the ionic polymerization of the 1,1-dicyano ethylene monomer, so that the 1-acetoxy-1,1-dicyano ethane pyrolysis product is ordinarily an inherently unstable material, and in the absence of a stabilizer (or even in the presence of certain know stabilizers) the monomeric 1,1-dicyano ethylene present in the pyrolysis product rapidly polymerizes ionically to form a low molecular weight 1,1-dicyano ethylene polymer that is of little or no value as such. This polymer can be separated from the remaining constituents in the pyrolysis product and then depolymerized to give the monomeric 1,1-dicyano ethylene in fairly pure form, as disclosed in U. S. Patent 2,535,827, but such a series of operations is obviously not desirable from the standpoint of efficiency and economy in a commercial plant.

Accordingly, it is an object of the present invention to provide materials which will effectively stabilize crude monomeric 1,1-dicyano ethylene against ionic polymerization and will inhibit the activity of any deleterious polymerization catalyst which may be present in the crude 1-acetoxy-1,1-dicyano ethane pyrolysis product. It is another object of this invention to provide stabilized compositions containing the 1-acetoxy-1,1-dicyano ethane pyrolysis product, in which compositions the 1,1-dicyano ethylene present remains in the monomeric form for extended periods of time, and which can be used as such, without the necessity for separation and purification of the monomeric 1,1-dicyano ethylene, in preparing useful polymers and interpolymers of 1,1-dicyano ethylene. Other objects will be apparent from the description which follows.

It has now been discovered that the above and other objects are attained by stabilizing crude monomeric 1,1-dicyano ethylene, and particularly the crude pyrolysis product of 1-acetoxy-1,1-dicyano ethane, with a dialkyl sulfate. In this manner, compositions are obtained in which the 1,1-dicyano ethylene remains in the monomeric form for relatively long periods of time. It thus becomes possible to store the 1-acetoxy-1,1-dicyano ethane pyrolysis product before using it. It also becomes possible to utilize such compositions in polymerization recipes and to obtain a useful high molecular polymer or interpolymer of 1,1-dicyano ethylene, rather than the low molecular polymer obtained when no stabilizer is utilized to inhibit the catalytic effect of the unidentified products in the pyrolysis mixture.

It is quite surprising that the dialkyl sulfates, which are esters, should act as stabilizers to prevent the ionic homopolymerization of monomeric 1,1-dicyano ethylene since many esters have the exactly opposite effect. For example 1,1-dicyano ethylene monomer polymerizes quite rapidly in the presence of trialkyl phosphates.

The dialkyl sulfates utilized as stabilizers according to this invention include dimethyl sulfate, diethyl sulfate, methyl ethyl sulfate, di-n-propyl sulfate, di-isopropyl sulfate, di-n-butyl sulfate, diamyl sulfate, dioctyl sulfates and the like all of which possess the structure

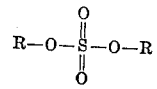

wherein each R represents an alkyl group preferably containing from 1 to 8 carbon atoms.

No special procedures are necessary in preparing the compositions of this invention. For example, they may be prepared simply by placing the di-alkyl sulfate in the receiver in which the 1-acetoxy-1,1-dicyano ethane pyrolysis product is condensed and collected. A more desirable expedient, however, consists in spraying the stabilizer into the condensing pyrolysis product as the latter enters the receiver, thus assuring more rapid and effective contact of stabilizer with pyrolysis product. Also, the stabilizer may be incorporated in a quench liquid if such is utilized to condense the pyrolysis product vapors, as disclosed in copending application Serial No. 286,496, filed May 7, 1952, or if desired, the stabilizer may even be added to the 1-acetoxy-1,1-dicyano ethane before its pyrolysis, in which event it is carried over into the pyrolysis product.

Any desired quantity of stabilizer may be utilized, although the optimum amount varies slightly with each batch of pyrolysis product, probably because of the different degree of 1-acetoxy-1,1-dicyano ethane decomposition obtained from run to run. In general, however, only small quantities of the order of about 0.01% to 1 or 2% by weight (based on the weight of the pyrolysis product) are desirably utilized, although amounts as high as 5 or 10% by weight or even higher may be employed, if desired. Large amounts of stabilizer are not preferably utilized, however, both for reasons of economy as well as because of the fact that the stability tends to drop off slightly when large amounts of the dialkyl sulfates are present, although such compositions do remain stable for a considerably longer period of time than pyrolysis products containing no stabilizer.

The following examples are intended to illustrate the unusual stability possessed by the novel compositions of this invention. They are not, however, to be construed as a limitation upon the scope thereof, for there are numerous possible variations and modifications.

*Examples I to IV*

Dimethyl sulfate and diethyl sulfate which are typical of the dialkyl sulfates disclosed hereinabove, are each added to a crude product obtained by pyrolysis of 1-acetoxy-1,1-dicyano ethane, as the product is condensed from a laboratory-scale pyrolysis reaction. The product contains monomer 1,1-dicyano ethylene in an amount of about 46%, acetic acid, and other unidentified products. The products treated with dialkyl sulfate, and a control, are maintained at 100° C. and the time required for polymerization of the monomeric 1,1-dicyano ethylene, is evidenced by formation of a non-flowing gel, and called the "gel time," is observed. The results are shown in the following table:

| Example | Stabilizer | Pyrolysis Product Volume (Ml.) | Stabilizer Concentration (Ml.) | Gel Time at 100° C. (Minutes) |
|---|---|---|---|---|
| | Control | 4 | | 70 |
| I | Dimethyl sulfate | 10 | 0.02 | >165 |
| II | ----do---- | 4 | 0.04 | >165 |
| III | ----do---- | 4 | 0.05 | >165 |
| IV | Diethyl sulfate | 4 | 0.05 | >165 |

In all of the above examples the product remained stable for more than 165 minutes whereas in the control product the 1,1-dicyano ethylene had polymerized in 70 minutes. By visual observation it was determined that the products of Example I was more stable than the product of Example II or III thus indicating that the lower stabilizer concentration is more effective.

The above examples have been concerned with stabilizing crude monomeric 1,1-dicyano ethylene obtained by the pyrolysis of 1-acetoxy-1,1-dicyano ethane. However, the crude monomer produced in other ways often contains impurities which cause it to polymerize by an ionic mechanism and the presence of the stabilizers of this invention is effective in preventing such polymerization. Accordingly, the invention is not limited to any particular process for securing crude unstable monomeric 1,1-dicyano ethylene.

It is also to be understood that the examples are not intended otherwise to limit the invention, since variations and modifications therein are within the spirit and scope of the appended claims.

I claim:

1. A composition comprising crude unstable monomeric 1,1-dicyano ethylene and, as a stabilizer therefor, a dialkyl sulfate present in a concentration of about 0.001% to about 10.0% by weight.

2. A composition comprising monomeric 1,1-dicyano ethylene, acetic acid and other substances resulting from the pyrolysis of 1-acetoxy-1,1-dicyano ethane, and as a stabilizer therefor, a dialkyl sulfate present in a concentration of about 0.001% to about 10.0% by weight.

3. A composition according to claim 2 wherein the stabilizer is present in a concentration of 0.01 to 2% by weight.

4. A composition according to claim 3 wherein the stabilizer is dimethyl sulfate.

5. A composition according to claim 4 wherein the stabilizer is diethyl sulfate.

ALAN E. ARDIS.

References Cited in the file of this patent

UNITED STATES PATENTS

| Number | Name | Date |
|---|---|---|
| 2,476,270 | Ardis | July 19, 1949 |
| 2,535,827 | Ardis et al. | Dec. 26, 1950 |